US006198945B1

United States Patent
Chen et al.

(10) Patent No.: US 6,198,945 B1
(45) Date of Patent: Mar. 6, 2001

(54) METHOD FOR PROVIDING A DIAL TONE FOR USE IN WIRELESS ENVIRONMENTS

(75) Inventors: Liang-Chuan Chen, Naperville; Parimal Vijaykant Joshi, Schaumburg; Stephen Thomas Luc; Atul Bhogilal Shah, both of Naperville; Ricky Lyn Willis, Yorkville, all of IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/010,901

(22) Filed: Jan. 22, 1998

(51) Int. Cl.[7] .............................. H04M 1/00; H04B 1/38
(52) U.S. Cl. ......................... 455/560; 455/414; 379/418
(58) Field of Search ...................................... 455/422, 426, 455/414, 428, 565, 528, 560–562, 401; 379/252, 253, 254, 255–257, 258, 277, 283, 418

(56) References Cited

U.S. PATENT DOCUMENTS

| | | | |
|---|---|---|---|
| 4,972,479 | * 11/1990 | Tobias, Jr. et al. | 380/33 |
| 5,305,308 | * 4/1994 | English et al. | 370/335 |
| 5,509,052 | * 4/1996 | Chia et al. | 455/465 |
| 5,703,933 | * 12/1997 | Ghisler | 455/422 |
| 5,724,656 | * 3/1998 | Vo et al. | 455/422 |
| 5,758,281 | * 5/1998 | Emery et al. | 455/428 |
| 5,781,625 | * 7/1998 | Sizer, II et al. | 379/257 |
| 5,799,254 | * 8/1998 | Karmi et al. | 455/528 |
| 5,913,176 | * 6/1999 | Barabash | 455/560 |

* cited by examiner

Primary Examiner—Dwayne D. Bost
Assistant Examiner—Charles Craver

(57) ABSTRACT

This invention provides a dial tone for use in analog, TDMA, and CDMA wireless environments and includes the capability to collect additional digits during certain calling feature activation. The dial tone supports call forwarding, cancel call forwarding, call waiting, cancel call waiting, calling number identification presentation, calling number identification restriction, three way calling (including IS-53 version of three way calling, three way calling with cancel call waiting and calling number identification presentation/restriction, and three way calling interactions with call forwarding), and limited call transfer. After the mobile user requests the desired feature, a tone generator typically located at the mobile switching station or the mobile station will provide dial tones or confirmation dial tones to aid the mobile users when initiating a calling feature.

13 Claims, 10 Drawing Sheets

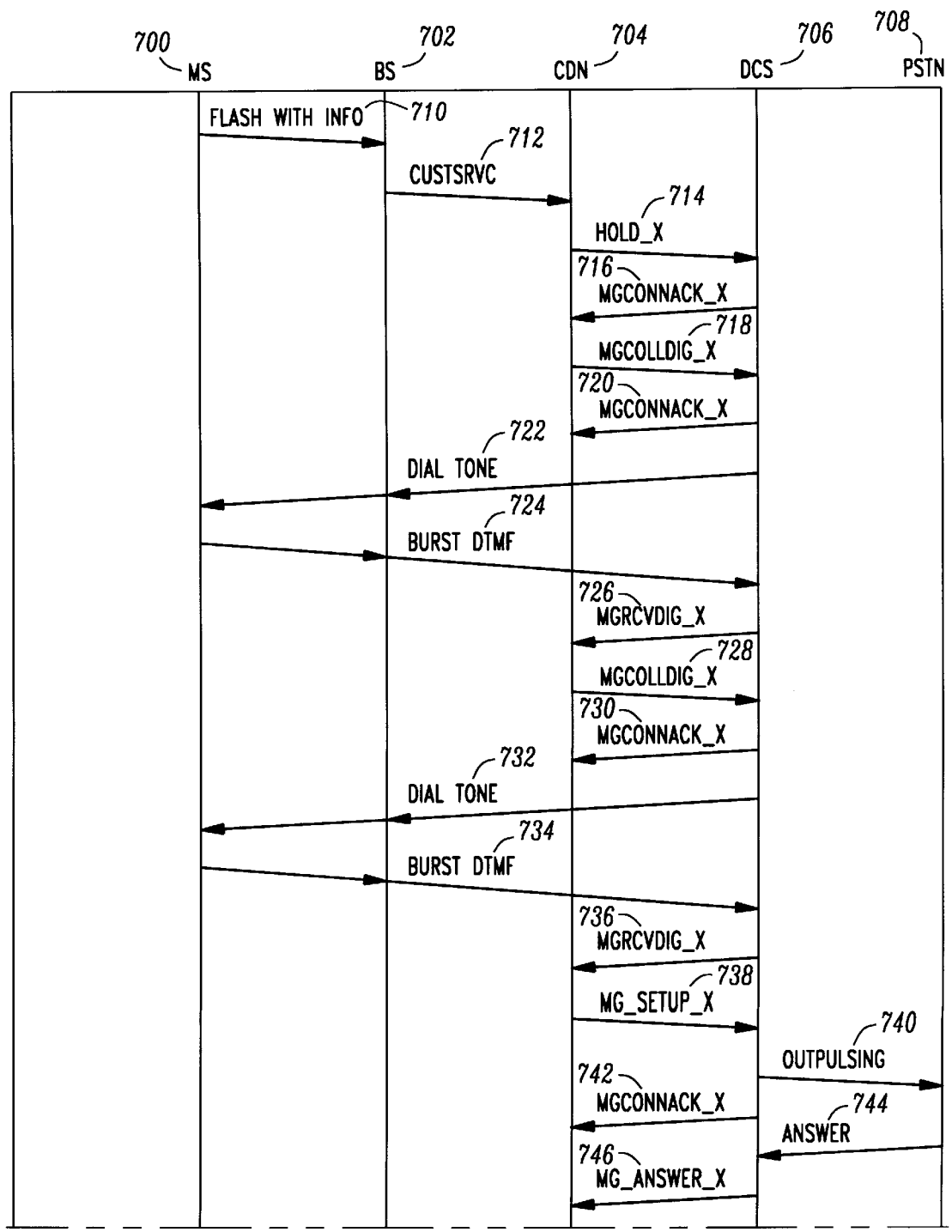

METHOD FOR PROVIDING A DIAL TONE FOR USE IN WIRELESS ENVIRONMENTS

FIELD OF THE INVENTION

This invention relates to the use of a dial tone feature for use with wireless technologies to provide a transparent operation between traditional plain old telephone service (POTS) and wireless environments.

BACKGROUND

Recently, wireless technologies have exploded into the marketplace with uses ranging from globe spanning satellite systems to local area networks. Many of these wireless systems use frequency division multiple access (FDMA), time division multiple access (TDMA) or code division multiple access (CDMA) multiplexing schemes for maximizing the capacity of from a given communication spectrum bandwidth.

CDMA systems do not separate signals according to frequency or time slots, but instead allow the signals to occupy the same bandwidth at the same time. Before the digital CDMA signals are commingled at the transmitter, each is processed by being exclusive-ORed (added modulo 2) to a different pseudorandom noise sequence. At the receiver for each channel, the signals are recovered by again exclusive-ORing the demodulated signal with the same pseudorandom noise sequence used during the encoding process. The pseudorandom noise sequences are all mutually orthogonal so that after receiving the encoded signal, the shared traffic in the channel sounds like random noise. As the channel usage increases, the signal-to-noise ratio degrades.

The specification for CDMA systems, Interim Standard No. 95 (IS-95) of the Telecommunications Industry Association (TIA), Arlington, Va. provides for two compression ratios for digitalized speech. One has a peak data rate of 8 kbps, the other 13 kbps. The former yields higher capacity, while the later produces higher voice quality. The CDMA systems regulate system power very precisely so that signals transmitted from mobile stations located near the base station do not overwhelm those signals transmitted from mobile stations at greater distances from the base station. The objective is to have all the signals arrive at the base station at approximately the same power level. Thus, services offered by a wireless environment should be transparent to those offered by a POTS environment.

As usage of wireless technology increases at a geometric rate, less technically sophisticated users become a larger percentage of the customer subscriber base. There exists a need for wireless technologies to emulate the features that are commonly found in the wireline environment (plain old telephone service (POTS) with enhanced services). Implementation of the wireless features by the customer subscriber is desired to have an interface that closely resembles the operation of the feature in a POTS environment.

The implementation of a dial tone for use with certain features such as call forwarding provides a transparent interface between plain old telephone service (POTS) and wireless environments. Eventually, new technologies will allow a wireless telephone to convert to a cordless telephone linked to an in home base station, provided the user is within a particular range of the base station. The implementation of this technology is often referred to as wireline, wireless wireline, wireline replacement, wireless local loop, and wireless local access service. Upon transfer from a cellular environment to a cordless environment, a transfer occurs switching the call from a mobile switching system to the public switched network. When this occurs, users will probably be charged a substantially lower per minute usage rate costs when using the public switched telephone network than when operating in the wireless environment. In addition, wireline service will provide increased user flexibility. However, the transition between the wired environment and the wireless environment requires a seamless, transparent interface. Invoking of calling features such as call forwarding and three way calling will need to be initiated in the same manner regardless of whether the call is made using the public switched telephone network or a wireless network.

SUMMARY

Providing a dial tone during the activation of certain features in a wireless environment assists in the creation of a transparent interface between traditional plain old telephone service (POTS) and wireless environments. This invention provides a dial tone for use in analog, TDMA, and CDMA wireless environments and includes the capability to collect additional digits during origination of certain calling feature activation, reactivation, and deactivation. The dial tone supports call forwarding, cancel call forwarding, cancel call waiting, calling number identification presentation, calling number identification restriction, three way calling (including TIA IS-53 version of three way calling, three way calling with cancel call waiting and calling number identification presentation/restriction, and three way calling interactions with call forwarding), and limited call transfer. However, other services utilizing tones are applicable. After the mobile user requests the desired feature, a tone generator typically located at the mobile switching station or the mobile station will provide dial tones, confirmation dial tones, and deactivation dial tones to aid the mobile users when initiating a calling feature.

The support of the dial tone or confirmation dial tone and collection of digits after the dial tone is generated can be supported by a variety of multiplexing schemes in the air interface, including traditional analog service, TDMA or CDMA. In addition, the initiation and generation of the dial tones, confirmation dial tones, and collection of digits after the dial tones can be accomplished when the mobile user is roaming outside a home area. Once again, providing these services provides a seamless, transparent interface between the user and the wireless/public switched telephone networks.

BRIEF DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

Implementation of a dial tone feature in a wireless environment is provided to allow cellular users implementing various features to experience a transparent operation between the cellular environment and the interface the user typically encounters when utilizing a calling feature in a plain old telephone service (POTS). The features normally subscribed to by users can include call forwarding, cancel call forwarding, cancel call waiting, calling number identification presentation, calling number identification restriction, three way calling (including TIA IS-53 version of three way calling, three way calling with cancel call waiting and calling number identification presentation/restriction, and three way calling interactions with call forwarding), and limited call transfer.

Figure 1:
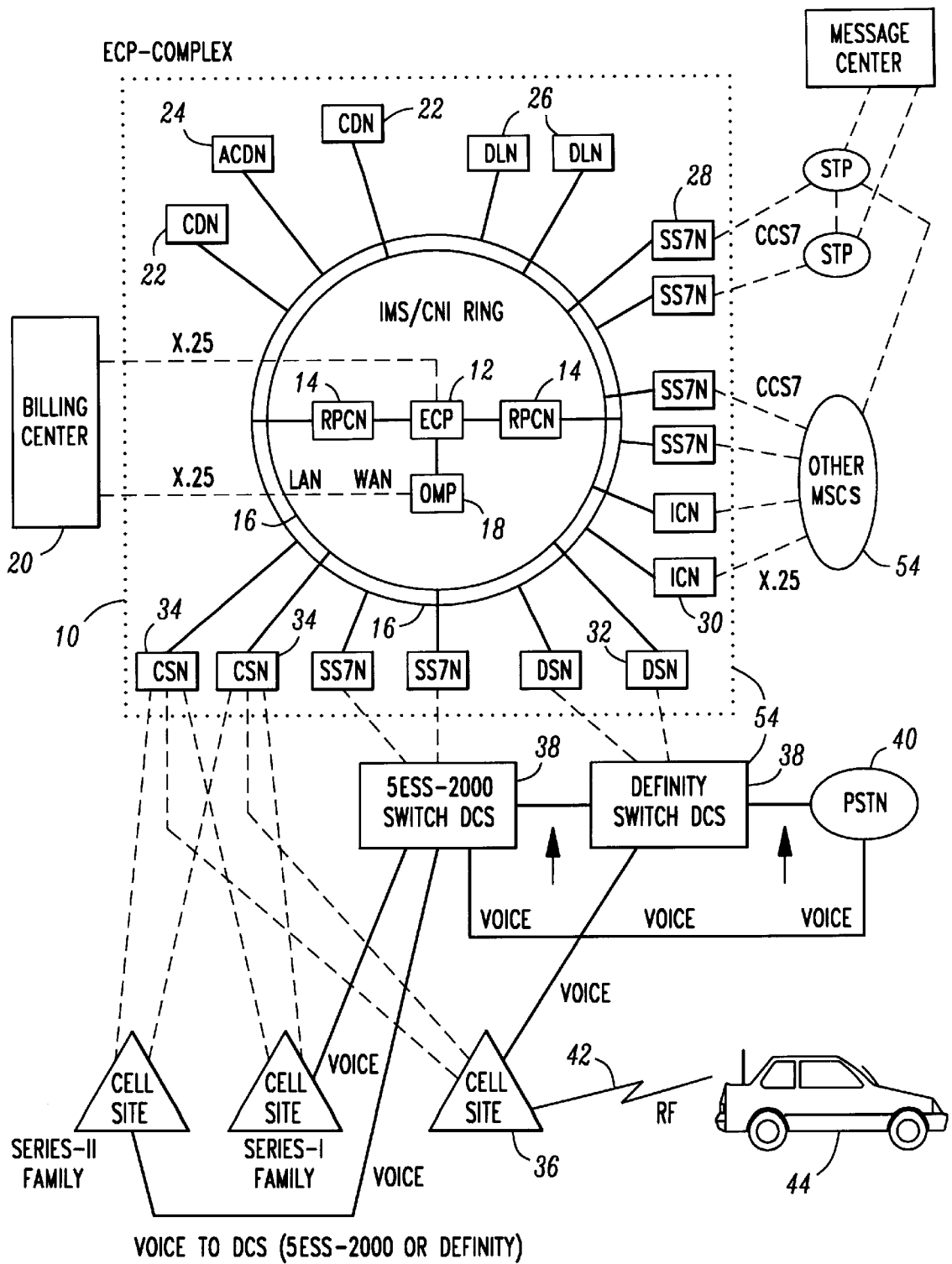
FIG. 1 illustrates a block diagram of the mobile switching center architecture.

FIG. 1 illustrates a block diagram of the wireless cellular architecture. In a typical cellular architecture an executive control/cellular processor complex 10 contains an executive control/cellular processor 12 connected to a ring peripheral controller node (RPCN) 14, both of which are linked to a ring structure 16 enabling information to travel around the ring structure 16. Also connected to the executive control/cellular processor and linked to the operations, maintenance and provisioning block 18 is a billing center 20. Also contained within the executive control/cellular processor complex 10 are call processing/database nodes (CDN) 22, administrative call processing nodes (ACDN) 24, direct link nodes (DLN) 26, SS7 nodes 28, ICN nodes 30, DSN nodes 32 and cell site nodes (CSN) 34. Connected externally to the executive control/cellular processor complex 10 are base stations 36 and digital cellular switches (DCS) 38. Both the executive control/cellular processor complex 10 and the digital cellular switches (DCS) 38 form the mobile switching centers 54. Connected to the digital cellular switches 38 is the public switched telephone network 40. Radio frequency channels 42 allow mobile stations 44 to communicate with other mobile stations or with customer premises equipment connected to the public switched telephone network 40.

When a call is initiated from a mobile station 44, a registration message is first sent to the base station 36 when the mobile station 44 turns on. When a call is initiated, a message is sent from the mobile station 44 to the base station 36 via the radio channel 42. The base station 36 sends a message to the cell site node 34. The call initiation message is sent via the ring structure 16 to the administrative call processing/database node 24. The administrative call processing/database node (ACDN) 24 balances cellular traffic among the call processing/database nodes (CDN) 22 and transfers the call initiation message to the desired call processing/database node (CDN) 22. The call processing/database node (CDN) 22 sends a message to the digital cellular switch (DCS) 38 via the ring structure 16 that creates a transmission link between the digital cellular switch 38 and the base station 36 supporting the mobile station 44.

In providing a transparent operation between the cellular architecture and the public switched telephone network 40, the objective is to provide a seamless or as seamless as possible an operation that resembles the operation commonly associated with the public switched telephone network 40. Currently, the use of a dial tones in a wireless environment does not exist. Use of a dial tone when implementing certain services is a feature that cannot only create a transparent interface but also assist users in implementing the desired features. After generation of the dial tone, the dial tone continues until the user inputs the first digit of a number after the dial tone is generated. The dial tone will terminate after a predetermined amount of time if the user does not input a digit after generation of the dial tone.

The dial tone can be created two ways. First, the dial tone can be created by initiation of a dial tone generator located at the digital cellular switch (DCS) 38. Once initiated, the dial tone continues until the mobile user inputs the first number at the mobile station 44. Second, the dial tone can be generated by a signal sent by the digital cellular switch 38 or some other part of the mobile switching center 10. This message is sent to the mobile station 44 and upon receipt, the mobile station 44 generates the dial tone until the user inputs the first number.

Figure 2:
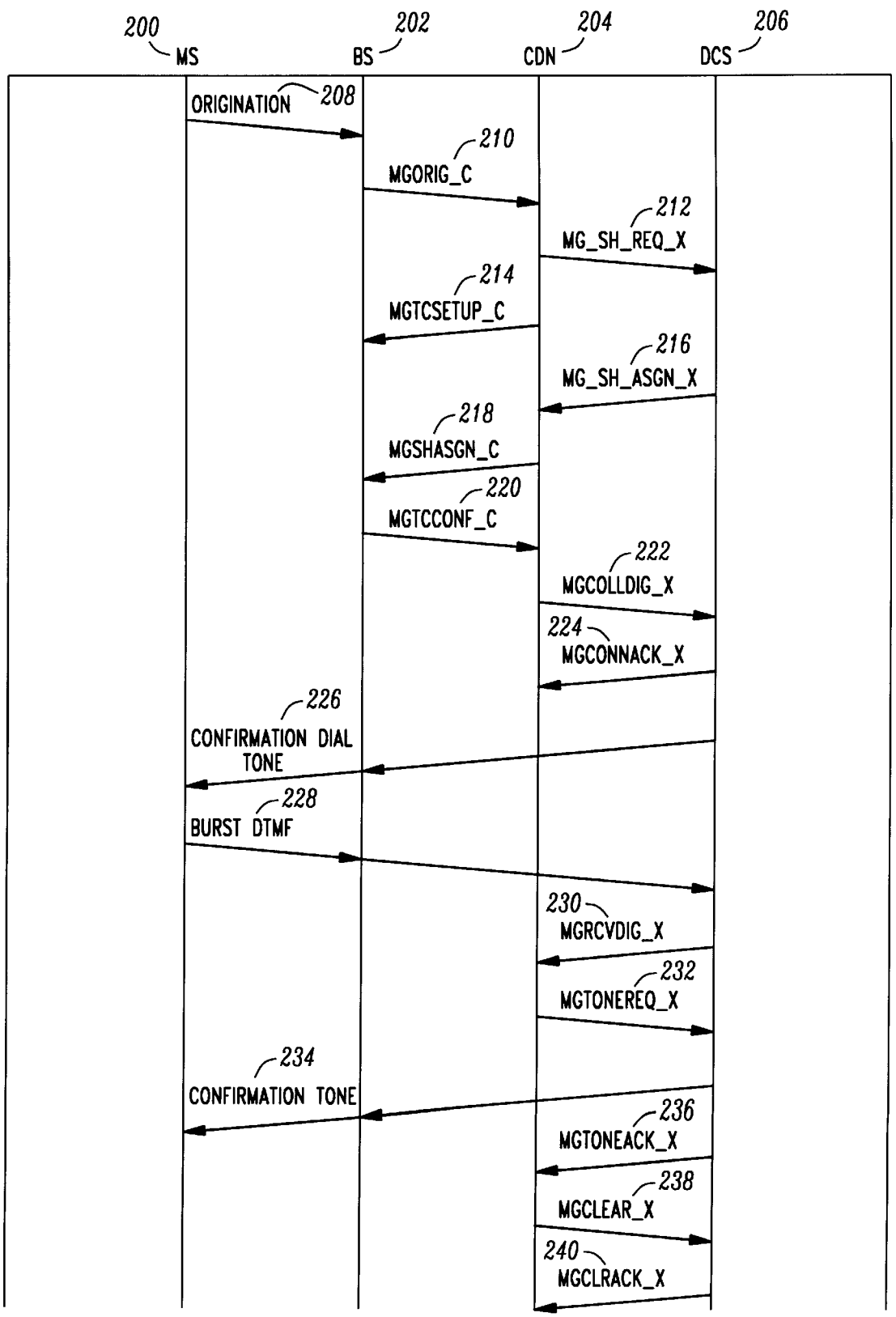
FIG. 2 illustrates a message flow diagram for the activation, reactivation and deactivation of conditional call forwarding and immediate call forwarding for wireline feature transparency.

FIG. 2 illustrates a message flow diagram for conditional call forwarding and immediate call forwarding reactivation for wireline feature transparency. The flow diagram of FIG. 2 illustrates the flow of message traffic between the mobile station (MS) 200, the base station (BS) 202, the call processing/database node (CDN) 204, and the digital cellular switch (DCS) 206. Please note, the reference numbers for the mobile stations, base stations, call processing/database nodes (CDN) and digital cellular switches change with each new figure but correspond to those items listed in FIG. 1.

FIG. 2 illustrates the message flows for providing a dial tone and collecting digits when initiating conditional call forwarding which is a custom calling feature that transfers the an incoming call to another destination. FIG. 2 also illustrates the custom calling feature, immediate call forwarding which allows a user to receive calls at a destination other than the mobile dialed number. When the incoming call is dialed to the mobile number, the mobile switching center changes its routing information and transfers the incoming call to the forwarding destination.

To activate conditional call forwarding and immediate call forwarding, the mobile user inputs an origination message 208 corresponding to the conditional call forwarding or immediate call forwarding feature reactivation code. Typically, this code consists of the star key and a two number sequence, e.g., *XY, followed by the Send key. Once received by the base station 202, a MGORIG_C message 210 is generated and transmitted to the executive control/cellular processor complex 10 where the message is received by the cell site node (CSN) 34 and travels along ring structure 16 to the administrative call processing/database node (ACDN) 24. The administrative call processing/database node 24 assigns the MGORIG_C message 210 to the appropriate call processing/database node (CDN) 204 so that the call traffic load is equalized among all of the call processing/database nodes (CDN) 204. The call processing/database node (CDN) 204 validates and performs a digit analysis on the message to determine if the mobile user is a subscriber to the requested calling feature. If authorization and validation is approved, the call processing/database node (CDN) 204 transmits the MG_SH_REQ_X message 212 to the digital cellular switch (DCS) 206.

The MG_SH_REQ_X message 212 instructs the digital cellular switch (DCS) 206 the a particular base station 202 has a mobile station 200 that is requesting the setup of a packet pipe from the speech handler to the mobile station 200. The call processing/database node (CDN) 204 sends a MGTCSETUP_C message 214 to the base station 202 so that the traffic channel can be setup. The digital cellular switch (DCS) 206 sends the MG_SH_ASGN_X message 216 to the call processing/database node (CDN) 204 assigning the speech handler. The call processing/database node (CDN) 204 send a MGSHASGN_C message 218 to the base station 202 informing the base station 202 that the traffic channel assignment is completed. The base station 202 sends a MGTCCONF_C message 220 informing the call processing/database node (CDN) 204 that the mobile is successful on the radio traffic channel and that the transmission is established between the digital cellular switch (DCS) 206 and the base station (BS) 202, requested calling feature is subscribed by the mobile user and to proceed with application of the confirmation dial tone and process of collecting digits.

The call processing/database node (CDN) 204 sends the digital cellular switch (DCS) 206 a MGCOLLDIG_X message 222 requesting the digital cellular switch (DCS) 206 to provide the dial tone, instructs the digital cellular switch (DCS) 206 as to the type of dial tone and to collect the digits from the mobile station 200. The digital cellular switch (DSC) 206 sends a MGCONNACK_X message 224 acknowledging the request for a specific dial tone. The digital cellular switch (DCS) 206 sends a confirmation dial tone 226 to the mobile station 200 via base station (BS) 202 on the established traffic channel and connects a digit collector for the receipt of digits dialed by the mobile user indicated by the burst dual tone multifrequency (DTMF) 228. These digits are the instruction for incoming calls to the mobile station 200 to be routed to a different number. The digit collector collects the necessary digits to forward the any incoming calls, or waits for a timer expiration.

Upon receipt of the first digit or DTMF 228, the digital collector terminates the dial tone 226 and continues collecting the additional digits. The digital cellular switch (DCS) 206 sends a MGRCVDIG_X message 230 collect the digits for digit analysis and instructs the call processing/database node (CDN) 204 to save the call forward number. The call processing/database node (CDN) 204 sends a MGTONEREQ_X message 232 requesting the digital cellular switch (DCS) 206 to provide the mobile station 200 with a confirmation tone 234 via the base station (BS) 202. The digital cellular switch (DCS) 206 sends a MGTONEACK_X message 236 to the call processing/database node (CDN) 204 acknowledging to the call processing/database node (CDN) 204 that the confirmation dial tone 234 was provided. The call processing/database node (CDN) 204 sends a MGCLEAR_X message 238 requesting the digital cellular switch (DCS) 206 disconnect the speech handler packet pipe. That provides transmission between the base station (BS) 202 a digital cellular switch (DCS) 206. The digital cellular switch (DCS) 206 sends a MGCLRACK_X message 240 acknowledging that the speech handler packet pipe was disconnected.

Figure 3:
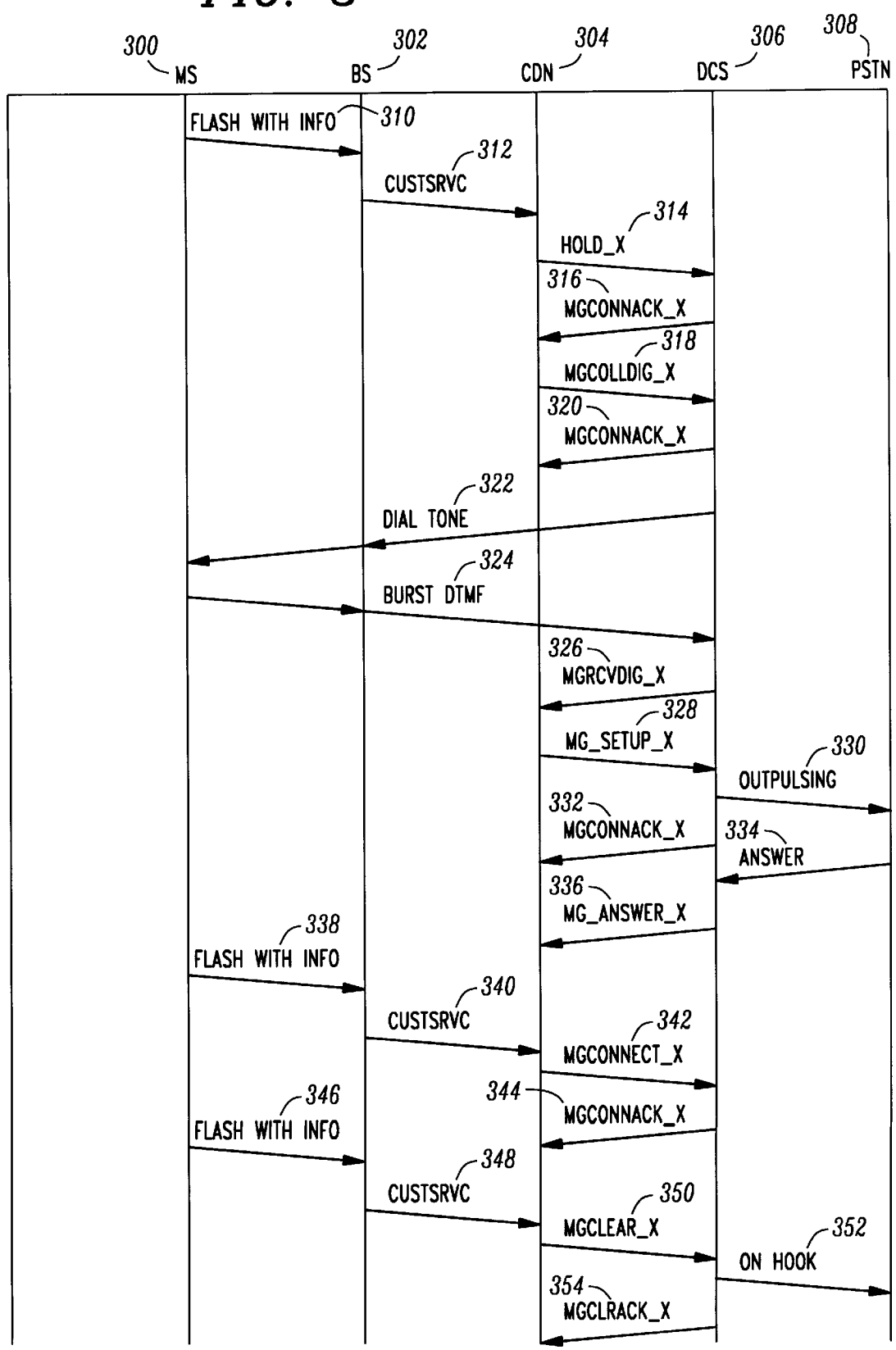
FIG. 3 illustrates a message flow diagram for the activation, reactivation and deactivation of three way calling use for wireline feature transparency.

FIG. 3 illustrates a message flow diagram for three way calling use for wireline feature transparency. The flow diagram of FIG. 3 illustrates the flow of message traffic between the mobile station (MS) 300, the base station (BS) 302, the call processing/database node (CDN) 304, the digital cellular switch (DCS) 306, and the public switched telephone network (PSTN) 308. This illustration assumes the third party to be joined in the three way call is not a mobile station. If the third party was located at a mobile station, another mobile switching center could be substituted in place of the public switched telephone network (PSTN) 308.

If two parties are engaged in a telephone conversation where at least one of the parties is using a mobile station, a third party can be added to the conversation by having the mobile user or one of the two mobile users entering a flash with information message 310. Typically, this flash with information message 310 is the Clear and Send key (depends upon the scheme adopted by the mobile service provider). The base station 302 receives the mobile flash with information message 310 and transmits a CUSTSRVC message 312 indicated to the call processing/database node (CDN) 304 that a flash with information message 310 has arrived. The call processing/database node (CDN) 304 receives the three way call request and transmits a HOLD_X message 314 to the digital cellular switch (DSC) 306 instructing the digital cellular switch (DCS) 306 to place the first party on hold. The digital cellular switch (DCS) 306 sends a MGCONNACK_X message 316 to the call processing/database node 304 acknowledging that the first party is placed on hold. The call processing/database node (CDN) 304 determines whether the mobile station is a subscriber to the three way calling feature. If so, the process continues.

The call processing/database node (CDN) 304 sends a MGCOLLDIG_X message 318 requesting the dial tone parameter and requesting the digital cellular switch (DCS) 306 to provide the dial tone from the dial tone generator. The digital cellular switch (DCS) 306 sends a MGCONNACK_X message 320 acknowledging the request. The digital cellular switch (DCS) 306 provides the dial tone 322 to the mobile station 300 on the traffic channel and connects the digit collector for receipt of the mobile station's dialed third party number digits in the form a burst dual tone multifrequency (DTMF) 324. Upon receipt of the first digit by the digital cellular switch (DCS) 306 or the expiration of a predetermined time period, the dial tone is terminated and the digit collector continues to collect digits until all the digits are received or the timer has expired.

The digital cellular switch (DCS) 306 transmits a MGRCVDIG_X message 326 tot eh call processing/database node (CDN) 304 regarding subscriber validation of the digit analysis. The call processing/database node (CDN) 304 sends a MG_SETUP_X message 328 to the digital cellular switch 306 requesting the third party call setup. The digital cellular switch (DCS) 306 outpulses the call to the public switched telephone network 308 for a POTS call and to another mobile switching center 54 for a mobile station call. The digital cellular switch (DCS) 306 sends a MGCONNACK_X acknowledgment message 332 to the call processing/database node (CDN) 304 acknowledging the third party setup.

The answer 334 to the third party call is sent to the digital cellular switch (DCS) 306. The digital cellular switch (DCS) 306 sends a MG_ANSWER_X message 336 to the call processing/database node (CDN) 304.

The mobile station user inputs the Clear and Send keys providing another flash with information message 338 that is transmitted from the mobile station 300 to the base station 302. The base station 302 sends a CUSTSRVC message 340 to the call processing/database node (CDN) 304 requesting to reconnect the first party with the third party. The call processing/database node (CDN) 304 sends a MGCONNECT_X message 342 to the digital cellular switch 306 requesting the reconnection of the first party. The digital cellular switch (DCS) 306 sends a MGCONNACK_X message 344 to the call processing/database node (CDN) 304 acknowledging receipt of the request.

To disconnect the third party, the mobile station 300 user once again inputs the Clear and Send key. This flash with information message 346 is sent from the mobile station 300 to the base station 302. The base station 302 sends the call processing/database node (CDN) 304 a CUSTSRVC message 348. The call processing/database node (CDN) 304 sends a MGCLEAR_X message 350 to the digital cellular switch (DSC) 306. The digital cellular switch 306 sends an on hook message 352 to the public switched telephone network (PSTN) 308 dropping the third party. The digital cellular switch (DSC) 306 sends a MGCLRACK_X message 354 to the call processing/database node (CDN) 304 acknowledging that the third party call was dropped.

Figure 4:
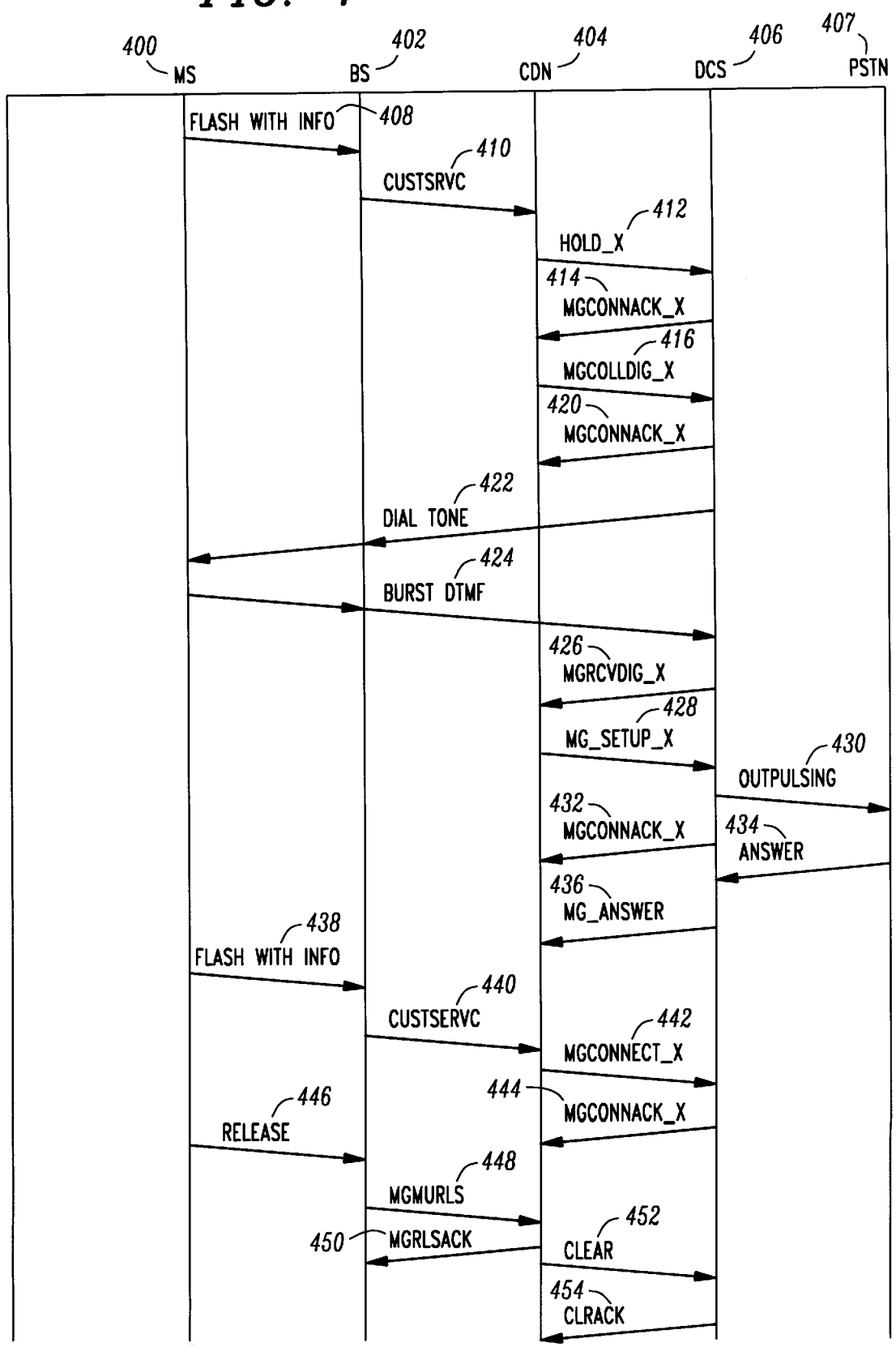
FIG. 4 illustrates a message flow diagram for the activation, reactivation and deactivation of limited call transfer use for wireline feature transparency.

FIG. 4 illustrates a message flow diagram for limited call transfer use for wireline feature transparency. The flow diagram of FIG. 4 illustrates the flow of message traffic between the mobile station (MS) 400, the base station (BS) 402, the call processing/database node (CDN) 404, and the digital cellular switch (DCS) 406.

Limited call transfer use is similar to three way calling in which the user only keys in a different sequence of numbers. Initiation of the feature begins when the user at the mobile station 400 enters a flash with information message 408. Typically, this flash with information message 408 is just the Clear and Send keys. The base station 402 receives the mobile flash with information message 408 and transmits a CUSTSRVC message 410 indicated to the call processing/database node (CDN) 404 that a flash with information message 408 has arrived. The call processing/database node (CDN) 404 receives the limited call transfer use request and transmits a HOLD_X message 412 to the digital cellular switch (DSC) 406 instructing the digital cellular switch (DCS) 406 to place the first party on hold. The digital cellular switch (DCS) 406 sends a MGCONNACK_X message 414 to the call processing/database node 404 acknowledging that the first party is placed on hold. The call processing/database node (CDN) 404 determines whether the mobile station is a subscriber to the three way calling feature. If so, the process continues.

The call processing/database node (CDN) 404 sends a MGCOLLDIG_X message 416 requesting the dial tone parameter or requesting the digital cellular switch (DCS) 406 to provide the dial tone from the dial tone generator. The digital cellular switch (DCS) 406 sends a MGCONNACK_X message 420 acknowledging the request. The digital cellular switch (DCS) 406 provides the dial tone 422 to the mobile station 400 on the traffic channel and connects the digit collector for receipt of the mobile station's dialed third party number digits in the form a burst dual tone multifrequency (DTMF) 424. Upon receipt of the first digit by the digital cellular switch (DCS) 406, the dial tone is terminated and the digit collector continues to collect digits until all the digits are received or the timer has expired.

The digital cellular switch (DCS) 406 transmits a MGRCVDIG_X message 426 to the call processing/database node (CDN) 404 regarding subscriber validation of the digit analysis. The call processing/database node (CDN) 404 sends a MG_SETUP_X message 428 to the digital cellular switch 406 requesting the third party call setup. The digital cellular switch (DCS) 406 outpulses the call to the public switched telephone network (PSTN) 407 for a POTS call and to another mobile switching center 54 for a mobile station call. The digital cellular switch (DCS) 406 sends a MGCONNACK_X acknowledgment message 432 to the call processing/database node (CDN) 404 acknowledging the third party setup.

The answer 434 to the third party call is sent to the digital cellular switch (DCS) 406. The digital cellular switch (DCS) 406 sends a MG_ANSWER message 436 to the call processing/database node (CDN) 404.

The mobile station user inputs the Send key providing another flash with information message 338 that is transmitted from the mobile station 400 to the base station 402. The base station 402 sends a CUSTSRVC message 440 to the call processing/database node (CDN) 404 requesting to transfer the call from the called party to a third party. The call processing/database node (CDN) 404 sends a MGCONNECT_X message 442 to the digital cellular switch 406 requesting the reconnection of the first party. The digital cellular switch (DCS) 406 sends a MGCONNACK_X message 444 to the call processing/database node (CDN) 404 acknowledging receipt of the request.

The release of the call is completed when the mobile station 400 once again inputs the Send key sending a release message 446 to the base station 402. The base station sends a MGMURLS message 448 to the call processing/database node (CDN) 404 indicating that the mobile station 400 has hung up. The call processing/database node (CDN) 404 sends a MGRLSACK message 450 acknowledging the mobile station 400 hang up, and sends a CLEAR message 452 to the digital cellular switch 406 clearing the packet pipe. The digital cellular switch (DCS) 406 sends a CLRACK message 454 to the call processing/database node (CDN) 404 acknowledging the clearing of the packet pipe.

Figure 5:
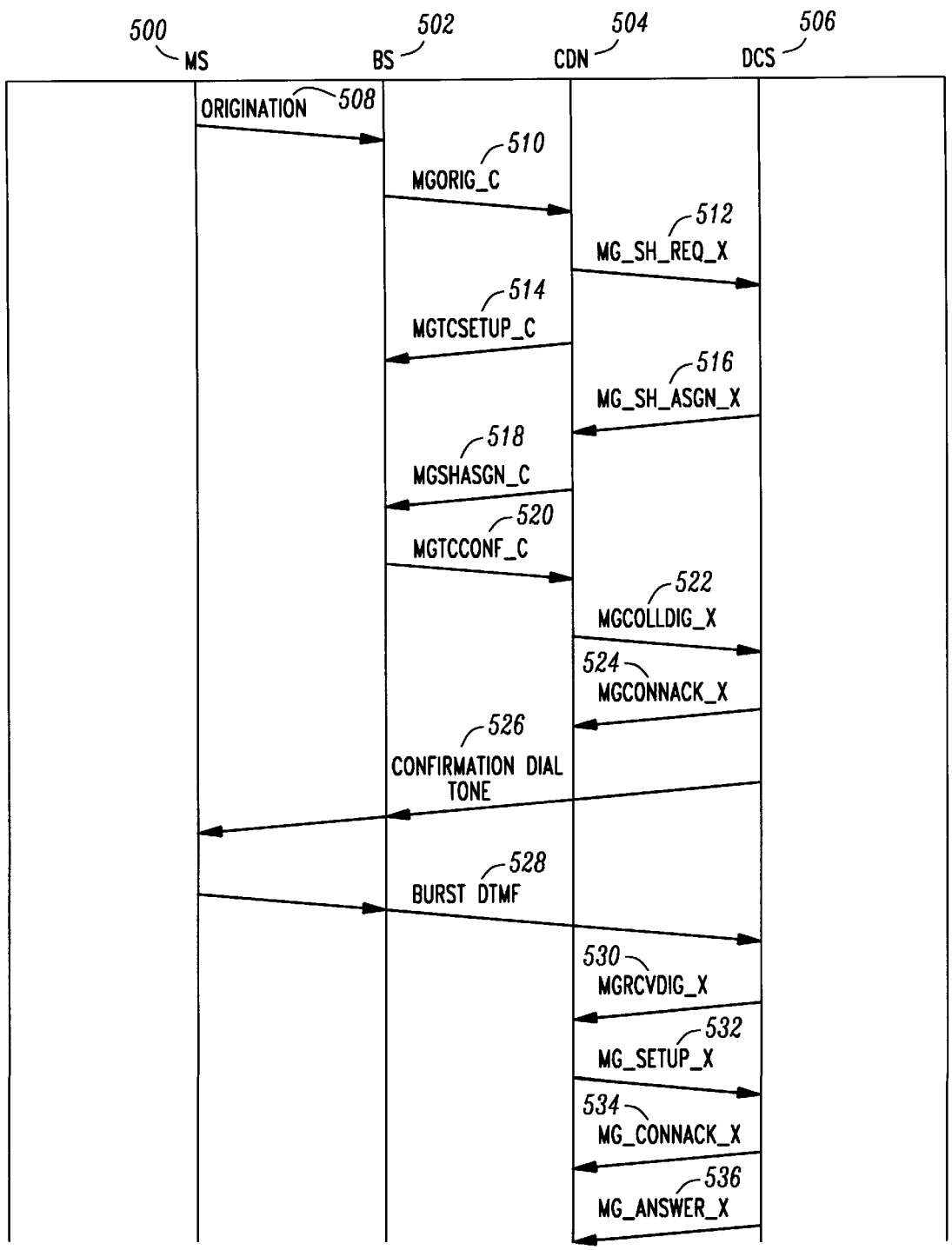
FIG. 5 illustrates a message flow diagram for the activation, reactivation and deactivation of cancel call waiting activation for wireline feature transparency.

FIG. 5 illustrates a message flow diagram for cancel call waiting activation for wireline feature transparency. The flow diagram of FIG. 2 illustrates the flow of message traffic between the mobile station (MS) 500, the base station (BS) 502, the call processing/database node (CDN) 504, and the digital cellular switch (DCS) 506.

To activate cancel call waiting, the mobile user inputs an origination message 508 corresponding to the cancel call waiting feature reactivation code. Typically, this code consists of the star key and a two number sequence, e.g., *XY, followed by the Send key. Once received by the base station 502, a MGORIG_C message 510 is generated and transmitted to the executive control/cellular processor complex 10 where the message is received by the cell site node (CSN) 34 and travels along ring structure 16 to the administrative call processing/database node (ACDN) 24. The administrative call processing/database node (CDN) 504 assigns the MGORIG_C message 510 to the appropriate call processing/database node (CDN) 504 so that the call traffic load is equalized among all of the call processing/database nodes (CDN) 504. The call processing/database node (CDN) 504 validates and performs a digit analysis on the message to determine if the mobile user is a subscriber to the requested calling feature. If authorization and validation is approved, the call processing/database node (CDN) 504 transmits the MG_SH_REQ_X message 512 to the digital cellular switch (DCS) 506.

The MG_SH_REQ_X message 512 instructs the digital cellular switch (DCS) 506 the a particular base station 502 has a mobile station 500 that is requesting the setup of a packet pipe from the speech handler to the mobile station 500. The call processing/database node (CDN) 504 sends a MGTCSETUP_C message 514 to the base station 502 so that the traffic channel can be setup. The digital cellular switch (DCS) 506 sends the MG_SH_ASGN_X message 516 to the call processing/database node (CDN) 504 assigning the speech handler. The call processing/database node (CDN) 504 send a MGSHASGN_C message 518 to the base station 502 informing the base station 502 that the traffic channel assignment is completed. The base station 502 sends a MGTCCONF_C message 520 informing the call processing/database node (CDN) 504 that the requested calling feature is subscribed by the mobile user and to proceed with application of the confirmation dial tone and process of collecting digits.

The call processing/database node (CDN) 504 sends the digital cellular switch (DCS) 506 a MGCOLLDIG_X message 522 requesting the digital cellular switch (DCS) 506 to provide the dial tone, instructs the digital cellular switch (DCS) 506 as to the type of dial tone and to collect the digits from the mobile station 500. The digital cellular switch (DSC) 506 sends a MGCONNACK_X message 524 acknowledging the request for a specific dial tone. The digital cellular switch (DCS) 506 sends a confirmation dial tone 526 to the mobile station 500 on the established traffic channel and connects a digit collector for the receipt of digits dialed by the mobile user indicated by the burst dual tone multifrequency (DTMF) 528. The digit collector collects the necessary digits to forward the any incoming calls, or waits for a timer expiration.

Upon receipt of the first digit or DTMF 528, the digital collector terminates the dial tone 526 and continues collecting the additional digits. The digital cellular switch (DCS) 506 sends a MGRCVDIG_X message 530 collecting digits and providing subscriber validation digit analysis. The call processing/database node (DCN) 504 sends a MG_SETUP_X message 532 to set up a call. The digital cellular switch (DCS) 506 sends a MG_CONNACK_X message 534 acknowledging the call setup message and when the party answers, the digital cellular switch (DCS) 506 sends a message MG_ANSWER_X message 536 that the party has answered.

Figure 6:
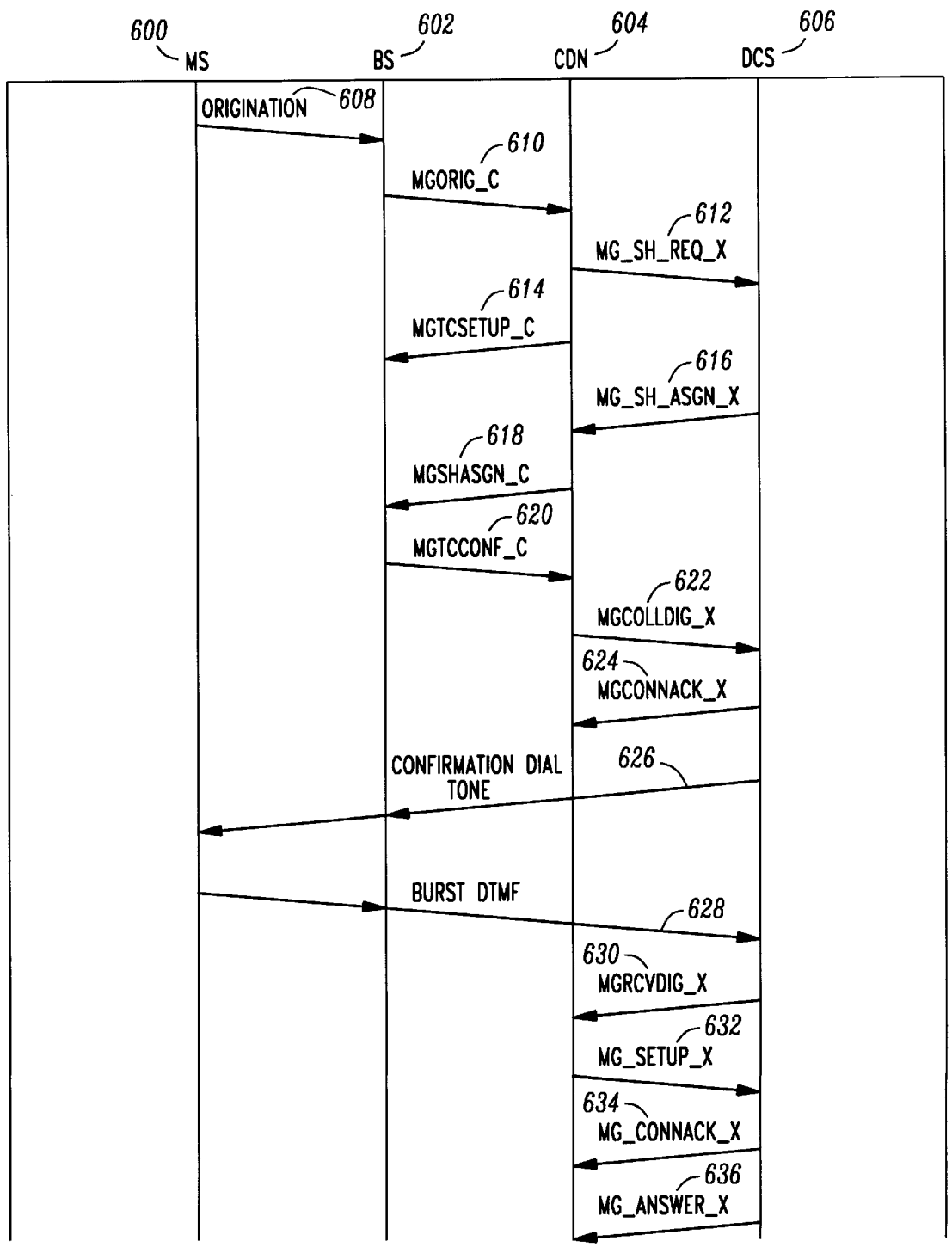
FIG. 6 illustrates a message flow diagram for the activation, reactivation and deactivation of calling number identification number with restriction for wireline feature transparency.

FIG. 6 illustrates a message flow diagram for calling number identification presentation with restriction for wireline feature transparency. The flow diagram of FIG. 2 illustrates the flow of message traffic between the mobile station (MS) 600, the base station (BS) 602, the call processing/database node (CDN) 604, and the digital cellular switch (DCS) 606. Calling number identification presentation with restriction does not pass the calling party identification number to the party prior to answering.

To activate calling number identification presentation with restriction, the mobile user inputs an origination message 608 corresponding to the calling number identification presentation with restriction feature reactivation code. Typically, this code consists of the star key and a two number sequence, e.g., *XY, followed by the Send key. Once received by the base station 602, a MGORIG_C message 610 is generated and transmitted to the executive control/cellular processor complex 10 where the message is received by the cell site node (CSN) 34 and travels along ring structure 16 to the administrative call processing/database node (ACDN) 24. The administrative call processing/database node (CDN) 604 assigns the MGORIG_C message 610 to the appropriate call processing/database node (CDN) 604 so that the call traffic load is equalized among all of the call processing/database nodes (CDN) 604. The call processing/database node (CDN) 604 validates and performs a digit analysis on the message to determine if the mobile user is a subscriber to the requested calling feature. If authorization and validation is approved, the call processing/database node (CDN) 604 transmits the MG_SH_REQ_X message 612 to the digital cellular switch (DCS) 606.

The MG_SH_REQ_X message 612 instructs the digital cellular switch (DCS) 606 the a particular base station 602 has a mobile station 600 that is requesting the setup of a packet pipe from the speech handler to the mobile station 600. The call processing/database node (CDN) 604 sends a MGTCSETUP_C message 614 to the base station 602 so that the traffic channel can be setup. The digital cellular switch (DCS) 606 sends the MG_SH_ASGN_X message 616 to the call processing/database node (CDN) 604 assigning the speech handler. The call processing/database node (CDN) 604 send a MGSHASGN_C message 618 to the base station 602 informing the base station 602 that the traffic channel assignment is completed. The base station 602 sends a MGTCCONF_C message 620 informing the call processing/database node (CDN) 604 that the requested calling feature is subscribed by the mobile user and to proceed with application of the confirmation dial tone and process of collecting digits.

The call processing/database node (CDN) 604 sends the digital cellular switch (DCS) 606 a MGCOLLDIG_X message 622 requesting the digital cellular switch (DCS) 606 to provide the dial tone, instructs the digital cellular switch (DCS) 606 as to the type of dial tone and to collect the digits from the mobile station 600. The digital cellular switch (DSC) 606 sends a MGCONNACK_X message 624 acknowledging the request for a specific dial tone. The digital cellular switch (DCS) 606 sends a confirmation dial tone 626 to the mobile station 600 on the established traffic channel and connects a digit collector for the receipt of digits dialed by the mobile user indicated by the burst dual tone multifrequency (DTMF) 628. The digit collector collects the necessary digits to forward the any incoming calls, or waits for a timer expiration.

Upon receipt of the first digit or DTMF 628, the digital collector terminates the dial tone 626 and continues collecting the additional digits. The digital cellular switch (DCS) 606 sends a MGRCVDIG_X message 630 providing subscriber validation digit analysis. The call processing/database node (DCN) 604 sends a MG_SETUP_X message 632 to set up a call. The digital cellular switch (DCS) 606 sends a MG_CONNACK_X message 634 acknowledging the call setup message and when the party answers, the digital cellular switch (DCS) 606 sends a message MG_ANSWER_X message 636 that the party has answered.

Figure 7B:
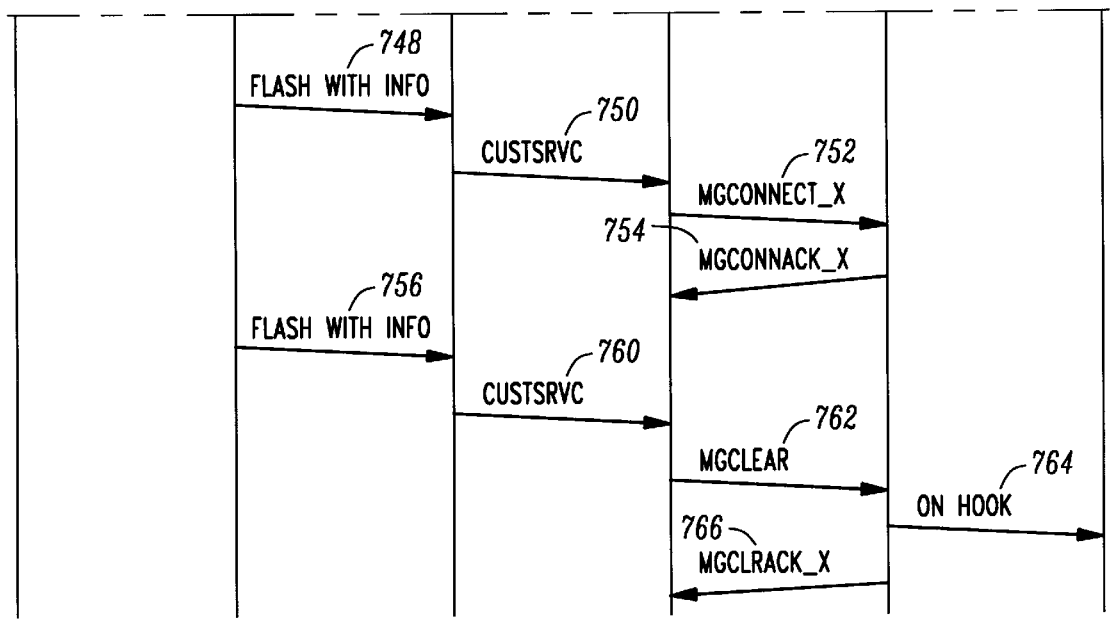
FIG. 7 illustrates a message flow diagram for the activation, reactivation and deactivation of three way calling use with feature interaction for wireline feature transparency.

FIG. 7 illustrates a message flow diagram for three way calling use with feature interaction for wireline feature transparency. The flow diagram of FIG. 2 illustrates the flow of message traffic between the mobile station (MS) 700, the base station (BS) 702, the call processing/database node (CDN) 704, the digital cellular switch (DCS) 706, and the public switched telephone network (PSTN) 708.

If two parties are engaged in a telephone conversation where at least one of the parties is using a mobile station, a third party can be added to the conversation by having the mobile user or one of the two mobile users entering a flash with information message 710. Typically, this flash with information message 710 is just the Send key. The base station 702 receives the mobile flash with information message 710 and transmits a CUSTSRVC message 712 indicated to the call processing/database node (CDN) 704 that a flash with information message 710 has arrived requesting a three way call request. The call processing/database node (CDN) 704 receives the three way call request and transmits a HOLD_X message 714 to the digital cellular switch (DSC) 706 instructing the digital cellular switch (DCS) 706 to place the first party on hold. The digital cellular switch (DCS) 706 sends a MGCONNACK_X message 716 to the call processing/database node 704 acknowledging that the first party is placed on hold. The call processing/database node (CDN) 704 determines whether the mobile station is a subscriber to the three way calling feature. If so, the process continues.

The call processing/database node (CDN) 704 sends a MGCOLLDIG_X message 718 requesting the dial tone parameter or requesting the digital cellular switch (DCS) 706 to provide the dial tone from the dial tone generator. The digital cellular switch (DCS) 706 sends a MGCONNACK_X message 720 acknowledging the request. The digital cellular switch (DCS) 706 provides the dial tone 722 to the mobile station 700 on the traffic channel and connects the digit collector for receipt of the mobile station's dialed third party number digits in the form a burst dual tone multifrequency (DTMF) 724. Upon receipt of the first digit by the digital cellular switch (DCS) 706, the dial tone is terminated and the digit collector continues to collect digits until all the digits are received or the timer has expired.

The digital cellular switch (DCS) 706 transmits a MGRCVDIG_X message 726 to the call processing/database node (CDN) 704 regarding subscriber validation of the digit analysis. The call processing/database node (CDN) 704 sends a MGCOLLDIG message 728 to the digital cellular switch (DCS) 706. The digital cellular switch (DCS) 706 sends a MGCONNACK_X message 730 acknowledging the MGCOLLDIG_X message 728.

The digital cellular switch (DCS) 706 transmits a dial tone 732 to the mobile station 700. After receiving the dial tone 732 at the mobile station 700, the user inputs a sequence of digits causing the transmission of a dual tone multifrequency (DTMF) 734 to the digital cellular switch (DCS) 706. The digital cellular switch (DCS) 736 sends a MGRCVDIG_X message 736 to the call processing/database node (CDN) 704. The call processing/database node (CDN) 704 sends a MG_SETUP_X message 738 to the digital cellular switch (DCS) 706 requesting the third party call setup. The digital cellular switch (DCS) 706 outpulses the call 740 to the public switched telephone network 708 for a POTS call and to another mobile switching center 54 for a mobile station call. The digital cellular switch (DCS) 706 sends a MGCONNACK_X acknowledgment message 742 to the call processing/database node (CDN) 704 acknowledging the third party setup.

The answer 744 to the third party call is sent to the digital cellular switch (DCS) 706. The digital cellular switch (DCS) 706 sends a MG_ANSWER message 746 to the call processing/database node (CDN) 704.

The mobile station user inputs the Send key providing another flash with information message 748 that is transmitted from the mobile station 700 to the base station 702. The base station 702 sends a CUSTSRVC message 750 to the call processing/database node (CDN) 704 requesting to reconnect the first party. The call processing/database node (CDN) 704 sends a MGCONNECT_X message 752 to the digital cellular switch 706 requesting the reconnection of the first party. The digital cellular switch (DCS) 706 sends a MGCONNACK_X message 754 to the call processing/database node (CDN) 704 acknowledging receipt of the request.

To disconnect the third party, the mobile station 700 user once again inputs the Send key. This flash with information message 756 is sent from the mobile station 700 to the base station 702. The base station 702 sends the call processing/database node (CDN) 704 a CUSTSRVC message 760. The call processing/database node (CDN) 704 sends a MGCLEAR_X message 762 to the digital cellular switch (DSC) 706. The digital cellular switch 706 sends a off hook message 764 to the public switched telephone network (PSTN) 708 dropping the third party. The digital cellular switch (DSC) 706 sends a MGCLRACK_X message 766 to the call processing/database node (CDN) 704 acknowledging that the third party call was dropped.

Figure 8:
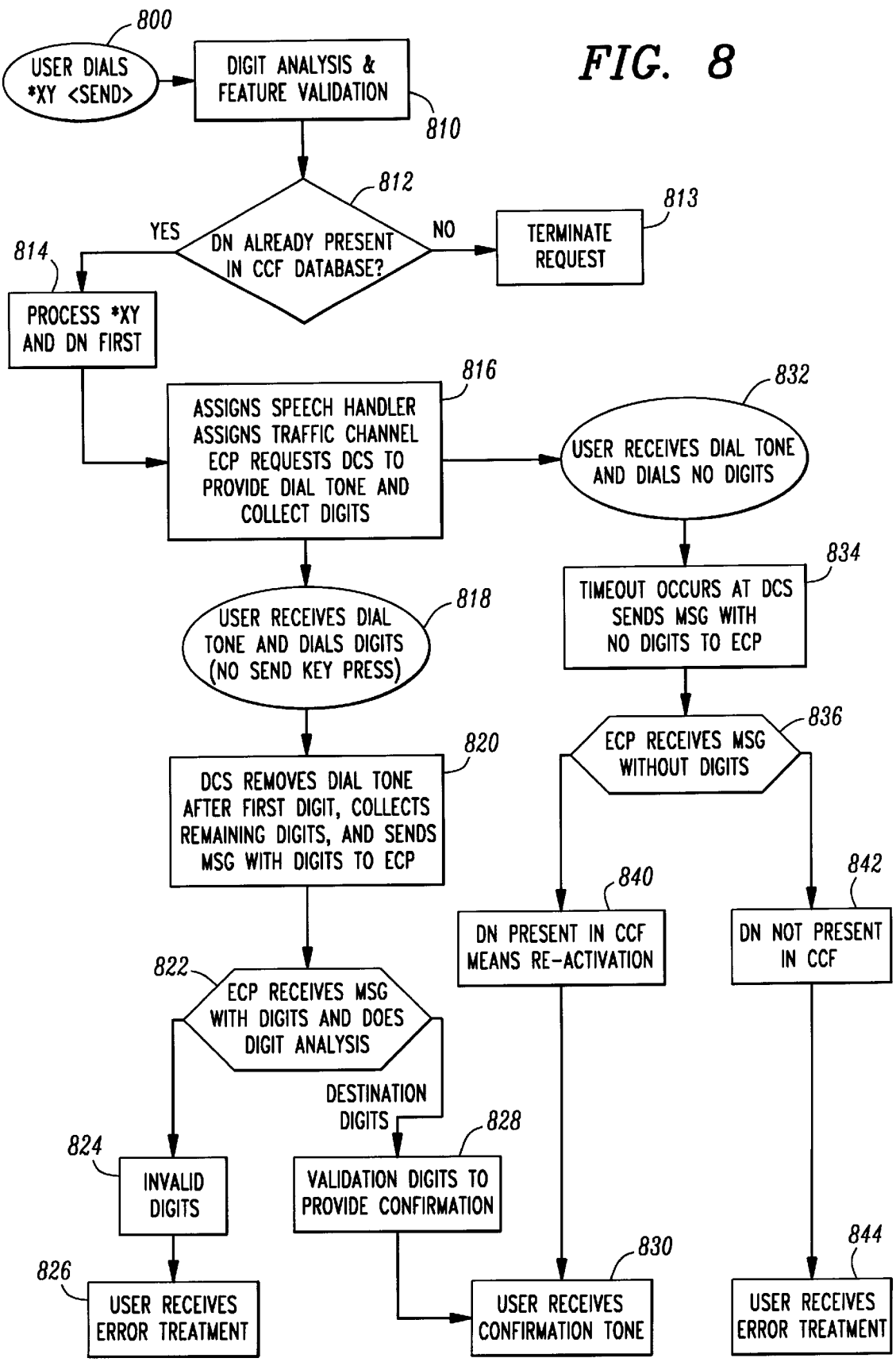
FIG. 8 illustrates the processing of a call feature request at a home mobile switching center.

FIG. 8 illustrates the processing of a call feature request at a home mobile switching center. When a user operating a mobile station 44 within a home range (non-roaming mode), the user initiates a call feature by pressing the *XY Send 800 on the mobile station's keypad. The XY represents the two digit number for initiating a calling feature. The mobile switching station receives the request for initialization of a calling feature and provides digit analysis and calling feature validation 810. A query is made as to whether the dialed number represents a calling feature present in the custom calling feature database. In FIG. 8, that query is for a conditional call forwarding (CCF) feature 812. If the query is no, the mobile switching center terminates the request 813. If the query is yes, the mobile switching center processes the *XY 814 and assigns a speech handler, assigns a traffic channel and the executive control/cellular processor, requests the digital cellular switch (DCS) to provide a dial tone and collect digits 816.

If the user receives a dial tone and inputs digits, the digital cellular switch removes or terminates the dial tone after receipt of the first digit, collects the remaining digits and sends a message to the executive control/cellular processor 820. The executive control/cellular processor receives the message with the digits and performs a digit analysis 822. If the digits are invalid 824, the user receives an error message 826. If the digits are valid 828, the user receives a confirmation tone 830.

If the user receives a dial tone and inputs no digits 832, a timeout occurs at the digital cellular switch and a message is sent to the executive control/cellular processor that no digits were collected. The executive control/cellular processor receives a message from the digital cellular switch without any digits 836. The dialed number in the conditional call forwarding (CCF) means reactivation 840 and the user receives a confirmation dial tone 830. Otherwise, the dialed number is not present in the conditional call forwarding calling feature database 842, and the user receives an error message 844.

Figure 9:
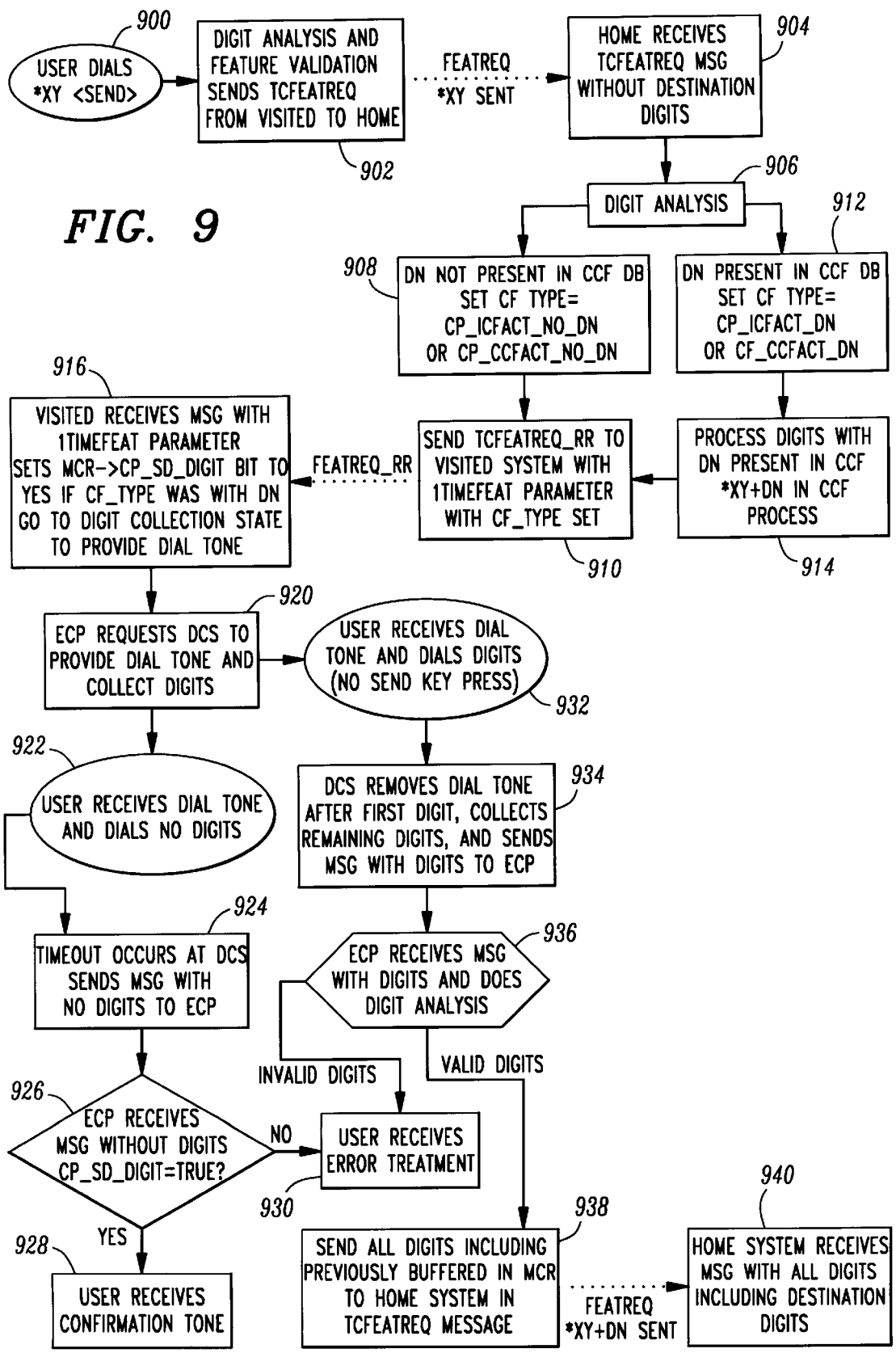
FIG. 9 illustrates the processing of a call feature request at a mobile switching center while the mobile station is roaming.

FIG. 9 illustrates the processing of a call feature request at a mobile switching center while the mobile station is in the roaming mode away from the mobile station's home range. The user initiates a call feature by pressing the *XY Send 900 on the mobile station's keypad. The XY represents the two digit number for initiating a calling feature. The mobile switching station receives the request for initialization of a calling feature and provides digit analysis and calling feature validation and the visiting mobile switching center sends a message to the home mobile switching center 902.

The home mobile switching center receives a message from the roaming mobile switching center 904 and performs a digit analysis 906. If the dialed number is not a calling feature subscribed to by the mobile station 908, then a message is sent to the roaming mobile switching center to terminate the initiation of the mobile stations request. If the dialed number is subscribed to 912, the home mobile switching center processes the digits 914 and sends an authorization message to the roaming mobile switching center 910.

The roaming mobile switching center receives the authorization message 916 and the executive control/cellular processor (roaming site) requests the digital cellular switch (roaming site) to provide a dial tone and collect digits 920. If the user receives a dial tone and dials no digits 922, a timeout occurs at the digital cellular switch and a message is sent to the executive control/cellular processor with no digits 924. The executive control/cellular processor receives the message 926 and sends either an error message 930 or a confirmation tone 928 depending upon the format of the calling feature.

If the user receives a dial. tone and inputs digits 932, the digital cellular switch removes or terminates the dial tone and collects the remaining digits 934. The executive control/cellular processor receives a message from the digital cellular switch and performs a digit analysis 936. If the digits are invalid, the user receives an error message 930. If the digits are valid, the digits are sent to the home system 938. The home system receives the message from the roaming mobile switching center 940.

A variety of types of dial tones can be sent. Tones such as those listed in TIA IS-95-A, ISDN and TIA IS-54B can be used as well as other tones implemented by the different standards bodies. For example, for illustration purposes, TABLE 1 lists the IS-95-A tones for signal_type="00."

TABLE 1

| Description | SIGNAL (binary) |
|---|---|
| Dial tone on: a continuous 350 Hz tone added to a 440 Hz tone. | 000000 |
| Ring back tone on: a 440 HZ tone added to a 480 Hz tone repeated in a 2 s on, 4 s off pattern. | 000001 |
| Intercept tone on: alternating 440 Hz and 620 Hz tones, each on 250 ms. | 000010 |
| Abbreviated intercept: alternating 440 HZ and 620 Hz tones, each on for 250 ms. Repeated for four seconds. | 000011 |
| Network congestion (reorder) tone on: a 480 Hz tone added to a 620 Hz tone repeated in a 250 ms on. 250 ms off cycle. | 000100 |

TABLE 1-continued

| Description | SIGNAL (binary) |
|---|---|
| Abbreviated network congestion (reorder): a 480 Hz tone added to a 620 Hz tone repeated in a 250 ms on, 250 ms off cycle for four seconds. | 000101 |
| Busy tone on: a 480 Hz tone added to a 620 Hz tone repeated in a 500 ms on, 500 ms off cycle. | 000110 |
| Confirm tone on: a 350 Hz tone added to a 440 Hz tone repeated 3 times in a 100 ms on, 100 ms off cycle. | 000111 |
| Answer tone on: answer tone is not presently used in North American networks. | 001000 |
| Call waiting tone on: a 300 ms burst of a 440 Hz tone. | 001001 |
| Tones off | 111111 |

TABLE 2 illustrates the type of second dial tone applied during the various call forwarding scenarios. The tone type includes confirmation dial tone (CDT) and a DCS confirmation dial tone which is the existing confirmation dial tone provided by the digital cellular switch (DCS) 38 during activation, reactivation and deactivation of the call forwarding feature.

TABLE 2

Call Forwarding Activation/Reactivation

| Feature | Activation | Reactivation | Deactivation | Tone | Tone Type | Message |
|---|---|---|---|---|---|---|
| ICF | X | | | 16 | CDT | COLLDIG_X |
| ICF | | X | | 16 | CDT | COLLDIG_X |
| ICF | | | X | n/a | DCT | TONEREQ_X |
| CCF | X | | | 16 | CDT | COLLDIG_X |
| CCF | | X | | 16 | CDT | COLLDIG_X |
| CCF | | | X | n/a | DCT | TONEREQ_X |

The mechanism for providing a second dial tone followed by the collection of in-band digits from the mobile station uses the modified MG_COLLDIG_X message to request the 5E-DCS to hook up the dial tone generator and tone decoder to the previously established speech channel. The in-band digit collection state is designed to handle the ECP/DCS interface for the dial tone feature. This state can be invoked during call origination for the activation/reactivation of the call forwarding feature. The dial tone is controlled by the mobile switching center 54 entry, provided the FAF activation entry is active.

The dial tone can also be replaced by a cellular network dial tone to meet a wireline transparency objective. This objective is to provide a dial tone for specific calls using certain custom calling features for a particular mobile station. The use of a network dial tone can be incorporated into cancel call waiting, calling number presentation, calling number identification restriction, three way calling, and limited call transfer.

The network dial tone feature is an executive cellular processor complex 10 feature that provides the capability to play either a dial tone or a confirmation dial tone, depending upon the feature interaction scenario. While playing the dial tone, the executive cellular processor complex 10 can collect additional dial digits from the mobile station 44.

The implementation of the cellular network dial tone can occur in an idle or busy state. In an idle state, prior to a mobile station 44 originating a call, using an existing executive control/cellular processor and the digital cellular switch interface mechanism requests from the digital cellular switch a confirmation dial tone and subsequently the executive control/cellular processor 12 collects the in-band digits input by the mobile station 44 in response to a user dialing any feature activation sequence code supporting a cellular network dial tone. The feature activation sequences supported by the idle state are cancel call waiting, calling number identification presentation, and calling number identification presentation with restriction. These features can also be cascaded providing a user with multiple confirmation dial tones after activation of the feature. Any other features not linked to the cellular network dial tone are processed under currently known schemes.

In the busy state, using an existing executive control/cellular processor and the digital cellular switch interface mechanism requests from the digital cellular switch a dial tone instead of a confirmation dial tone, and subsequently collects the in-band digits in response to a user's input after receiving the dial tone. In the busy state, the IS-53 three way calling feature must be available (provisioned), otherwise the cellular network dial tone feature will not work. When the IS-53 three way calling feature is provisioned to play an announcement, the announcement will override the cellular network dial tone. All other IS-53 provisions are overridden by the cellular network dial tone.

In addition, the call forwarding feature activation, reactivation, and deactivation sequences are also supported in the busy state. The validating dialing sequences for call forwarding are *XY and *XY+DN, where XY is the call forwarding sequence and DN is the directory number of the user's mobile station. For the first call forwarding sequence, the user is expected to enter the call forwarded directory number and not the third party directory number upon receiving the confirmation dial tone. Once the confirmation dial tone is dialed and validated, the user will then be placed into the normal two party talk state.

While using the cellular network dial tone, TABLE 3 lists the various types of network capable of supporting the feature.

TABLE 3

Supported Dial Tones for Wireline Transparency Feature

| Feature | Activation | Use | Tone OPCode | Tone Type | DSC/ECPC Messages |
|---|---|---|---|---|---|
| CCW | X | | 16 | CDT | COLLDIG_X/RCVDIG_X |
| CNIP/R | | X | 16 | CDT | COLLDIG_X/RCVDIG_X |
| CF | X | | 16 | CDT | COLLDIG_X/RCVDIG_X |
| TWC | | X | 05 | NDT | COLLDIG_X/RCVDIG_X |
| LCT | | X | 05 | NDT | COLLDIG_X/RCVDIG_X |

In TABLE 3, the abbreviations are cancel call waiting (CCW), calling number identification presentation (CNIP), calling number identification resource (CNIR), call forwarding (CF), three way calling (TWC), limited call transfer (LTC), confirmation dial done from the digital cellular switch (CDT) and network dial tone provided by the digital cellular switch (NDT).

While exemplary systems and methods embodying the present invention are shown by way of example, it will be understood, of course, that the invention is not limited to these embodiments. Modifications may be made by those skilled in the art, particularly in light of this disclosure. For example, each of the elements of the disclosed embodiments may be utilized alone or in combination with elements of the other embodiments.

We claim:

1. A method for providing a dial tone in a wireless environment, comprising the steps of:
   transmitting a first signal from a mobile station to a base station where the first signal initiates a request for a dial tone from a dial tone generator;
   receiving the first signal at the base station; the base station transmitting a second signal from the base station to an administrative call processing node located at a mobile switching center;
   receiving the second signal at the administrative call processing node;
   assigning the second signal to a call processing node;
   receiving at the call processing node of the second signal;
   transmitting a third signal from the call processing node to a digital cellular switch;
   receiving the third signal at the digital cellular switch;
   generating a dial tone in response to the third signal;
   transmitting the dial tone from the digital cellular switch to the base station;
   transmitting the dial tone from the base station to the mobile station.

2. The method of claim 1, where the first signal is an analog signal.

3. The method of claim 1, where the first signal is a time division multiple access signal.

4. The method of claim 1, where the first signal is a code division multiplexed signal.

5. The method of claim 1, further comprising the steps of:
   confirming the request for the dial tone is authorized for use by the mobile station.

6. The method of claim 1, further comprising the steps of:
   inputting at least one digit at the mobile station;
   transmitting the at least one digit from the mobile station to the base station;
   forwarding the at least one digit from the base station to the digital cellular switch;
   collecting the at least one digit at the digital cellular switch;
   terminating the transmission of the dial tone;
   forwarding the at least one digit from the digital cellular switch to the call processing node; and
   performing at least one desired task based on receipt of the at least one digit by the call processing node.

7. The method of claim 6, where the first signal is an analog signal.

8. The method of claim 6, where the first signal is a time division multiple access signal.

9. The method of claim 6, where the first signal is a code division multiplexed signal.

10. A method for providing a dial tone in a wireless environment, comprising the steps of:

transmitting a first signal from a mobile station to a base station where the first signal initiates a request for a dial tone from a dial tone generator;

receiving the first signal at the base station; the base station transiting a second signal from the base station to an administrative call processing mode located at a mobile switching center, where the second signal forwards the request by the mobile station for the dial tone;

receiving at the call processing node the assignment of the second signal;

transmitting a third signal from the call processing node to a digital cellular switch, where the third signal forwards the request by the mobile station for the dial tone;

receiving the third signal at the digital cellular switch;

analyzing the request by the mobile station for the dial tone as to whether authorization for the dial tone is allowed, and if so:

transmitting a fourth signal from the call processing node to the base station, the fourth signal providing authorization for the mobile station to generate the dial tone;

receiving the fourth signal at the base station and transmitting the fourth signal from the base station to the mobile station;

receiving the fourth signal at the mobile station;

generating the dial tone at the mobile station from a dial tone generator located at the mobile station;

inputting at least one digit at the mobile station;

terminating the dial tone;

transmitting the at least one digit from the mobile station to the base station;

forwarding the at least one digit at the digital cellular switch;

forwarding the at least one digit from the digital cellular switch to the call processing node; and performing at least one desired task based on receipt of the at least one digit by the call processing node.

11. The method of claim 10, where the first signal is an analog signal.

12. The method of claim 10, where the first signal is a time division multiple access signal.

13. The method of claim 10, where the first signal is a code division multiplexed signal.

* * * * *